United States Patent
Lee et al.

(10) Patent No.: US 10,767,052 B2
(45) Date of Patent: Sep. 8, 2020

(54) POLYCARBONATE RESIN COMPOSITION

(71) Applicant: LG CHEM, LTD., Seoul (KR)

(72) Inventors: Ki Jae Lee, Daejeon (KR); Jung Jun Park, Daejeon (KR); Moo Ho Hong, Daejeon (KR); Hyong Min Bahn, Daejeon (KR); Young Young Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 40 days.

(21) Appl. No.: 16/068,612

(22) PCT Filed: Oct. 17, 2017

(86) PCT No.: PCT/KR2017/011478
§ 371 (c)(1),
(2) Date: Jul. 6, 2018

(87) PCT Pub. No.: WO2018/074822
PCT Pub. Date: Apr. 26, 2018

(65) Prior Publication Data
US 2019/0016891 A1    Jan. 17, 2019

(30) Foreign Application Priority Data

Oct. 20, 2016  (KR) .................. 10-2016-0136731
Oct. 16, 2017  (KR) .................. 10-2017-0134207

(51) Int. Cl.
*C08L 69/00*     (2006.01)
*C08L 83/10*     (2006.01)
(Continued)

(52) U.S. Cl.
CPC .............. *C08L 83/10* (2013.01); *C08G 64/18* (2013.01); *C08G 64/186* (2013.01); *C08L 69/00* (2013.01);
(Continued)

(58) Field of Classification Search
None
See application file for complete search history.

(56) References Cited

U.S. PATENT DOCUMENTS 5,608,026 A    3/1997  Hoover et al.
6,486,294 B1  11/2002  Brack et al.
(Continued)

FOREIGN PATENT DOCUMENTS

EP    0524731 B1   3/2002
EP    3067380 A1   9/2016
(Continued)

Primary Examiner — David J Buttner
(74) Attorney, Agent, or Firm — Dentons US LLP

(57) ABSTRACT

The present disclosure relates to a polycarbonate resin composition having increased fluidity and excellent physical properties, and comprising:

a first copolycarbonate comprising a repeating unit represented by Chemical Formula 1, a repeating unit represented by Chemical Formula 2, and a repeating unit represented by Chemical Formula 3 below; and a second copolycarbonate comprising a repeating unit represented by Chemical Formula 1 and a repeating unit represented by Chemical Formula 4 below,

[Chemical Formula 1]

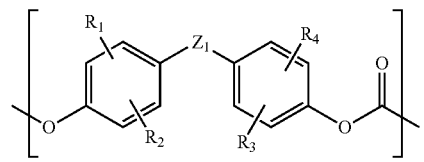

[Chemical Formula 2]

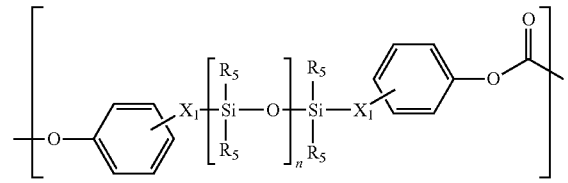

[Chemical Formula 3]

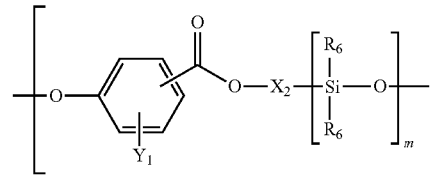

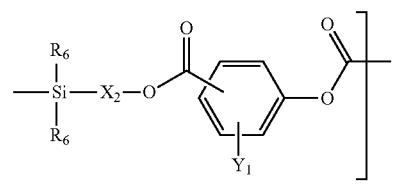

(Continued)

[Chemical Formula 4]

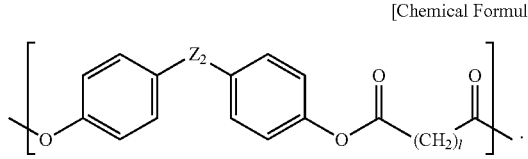

11 Claims, No Drawings

(51) Int. Cl.
*C08G 64/18* (2006.01)
*C08G 77/448* (2006.01)
*C08G 77/398* (2006.01)

(52) U.S. Cl.
CPC ......... *C08G 77/398* (2013.01); *C08G 77/448* (2013.01); *C08L 2205/02* (2013.01)

(56) References Cited

U.S. PATENT DOCUMENTS

| | | |
|---|---|---|
| 9,255,179 B2 | 2/2016 | Park et al. |
| 9,745,466 B2 | 8/2017 | Park et al. |
| 9,840,585 B2 | 12/2017 | Park et al. |
| 9,902,853 B2 | 2/2018 | Hwang et al. |
| 9,969,841 B2 | 5/2018 | Hwang et al. |
| 2010/0129649 A1* | 5/2010 | Malinoski ............. C08L 69/005 428/339 |
| 2013/0309474 A1 | 11/2013 | Peek et al. |
| 2014/0371360 A1* | 12/2014 | Zheng ................... C08L 69/00 524/116 |
| 2015/0344623 A1* | 12/2015 | Park ................... C08G 64/1666 528/29 |
| 2015/0344687 A1 | 12/2015 | Van Zyl et al. |
| 2016/0369095 A1* | 12/2016 | Park ..................... C08G 64/24 |
| 2017/0298221 A1* | 10/2017 | Son ....................... C08G 64/24 |

FOREIGN PATENT DOCUMENTS

| | | |
|---|---|---|
| JP | 05186675 A | 7/1993 |
| JP | 05222173 A | 8/1993 |
| JP | 10007897 A | 1/1998 |
| JP | 2002069275 A | 3/2002 |
| JP | 2003128886 A | 5/2003 |
| JP | 2005517782 A | 6/2005 |
| KR | 10-2016-0067714 A | 6/2016 |
| KR | 10-2016-0067731 A | 6/2016 |
| KR | 10-2016-0067762 A | 6/2016 |
| KR | 10-2018-0043685 A | 4/2018 |
| WO | 20130175445 A2 | 11/2013 |
| WO | 2015041441 A1 | 3/2015 |
| WO | 2016/089024 A1 | 6/2016 |
| WO | 2016089028 A1 | 6/2016 |

* cited by examiner

POLYCARBONATE RESIN COMPOSITION

CROSS-REFERENCE TO RELATED APPLICATION

This application is a National Stage Entry of International Application No. PCT/KR2017/011478, filed on Oct. 17, 2017, and claims the benefit of and priority to Korean Application No. 10-2016-0136731, filed on Oct. 20, 2016, and Korean Application No. 10-2017-0134207, filed on Oct. 16, 2017, all of which are hereby incorporated by reference in their entirety for all purposes as if fully set forth herein.

TECHNICAL FIELD

The present invention relates to a polycarbonate resin composition capable of improving fluidity of a copolycarbonate in which a polysiloxane structure is introduced into the main chain of the polycarbonate.

BACKGROUND OF ART

Polycarbonate resins are prepared by condensation-polymerization of an aromatic diol such as bisphenol A with a carbonate precursor such as a phosgene, and have excellent impact strength, dimensional stability, heat resistance, and transparency. Thus, the polycarbonate resins have application in a wide range of uses, such as exterior materials of electrical and electronic products, automobile components, building materials, and optical components.

Recently, in order to apply these polycarbonate resins to more various fields, many studies have been made to obtain desired physical properties by copolymerizing two or more aromatic diol compounds having different structures from each other and introducing monomers having different structures into a main chain of the polycarbonate.

In particular, studies for introducing a polysiloxane structure into a main chain of the polycarbonate have been undertaken. However, most of these technologies have disadvantages in that the production cost is high, and when chemical resistance or impact strength, especially low-temperature impact strength, is improved, the fluidity, etc., are deteriorated.

Accordingly, the present inventors have conducted intensive studies about a method of increasing the fluidity while maintaining excellent physical properties of the copolycarbonate in which the polysiloxane structure is introduced into the main chain of the polycarbonate as much as possible. As a result, it has been found that a polycarbonate resin composition containing a copolycarbonate in which a sebacoyl structure is introduced, in addition to a copolycarbonate in which a polysiloxane structure is introduced, as described later, satisfies the above requirements. The present invention has been completed on the basis of such finding.

DETAILED DESCRIPTION OF THE INVENTION

Technical Problem

It is one object of the present invention to provide a polycarbonate resin composition capable of improving the fluidity of a copolycarbonate in which a polysiloxane structure is introduced into the main chain of the polycarbonate.

Technical Solution

An exemplary embodiment of the present invention provides a polycarbonate resin composition including:
a first copolycarbonate including a repeating unit represented by Chemical Formula 1 below, a repeating unit represented by Chemical Formula 2 below, and a repeating unit represented by Chemical Formula 3 below; and
a second copolycarbonate including a repeating unit represented by Chemical Formula 1 below and a repeating unit represented by Chemical Formula 4 below:

[Chemical Formula 1]

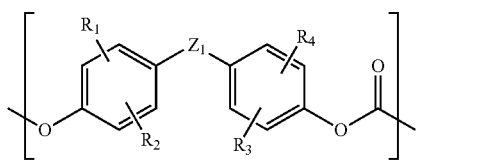

wherein, in Chemical Formula 1,
$R_1$ to $R_4$ are each independently hydrogen, a $C_{1-10}$ alkyl, a $C_{1-10}$ alkoxy, or a halogen, and
$Z_1$ is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO;

[Chemical Formula 2]

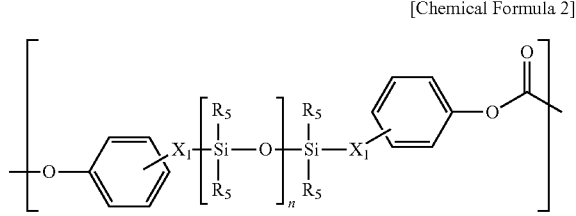

wherein, in Chemical Formula 2,
each $X_1$ is independently a $C_{1-10}$ alkylene,
each $R_5$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and
n is an integer of 10 to 200,

[Chemical Formula 3]

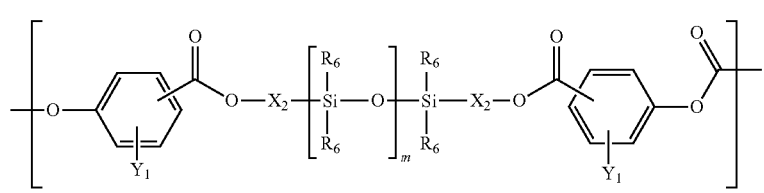

wherein, in Chemical Formula 3, each $X_2$ is independently a $C_{1-10}$ alkylene, each $Y_1$ is independently hydrogen, a $C_{1-6}$ alkyl, a halogen, a hydroxy, a $C_{1-6}$ alkoxy, or a $C_{6-20}$ aryl, each $R_6$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and m is an integer of 10 to 200,

[Chemical Formula 4]

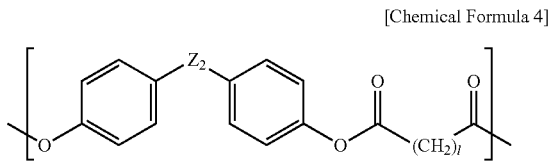

wherein, in Chemical Formula 4, $Z_2$ is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO, and l is an integer of 1 to 10.

The polycarbonate is prepared by condensation-polymerization of an aromatic diol compound such as bisphenol A with a carbonate precursor such as a phosgene, and has excellent impact strength, dimensional stability, heat resistance, and transparency.

Thus, such polycarbonate has application in a wide range of uses, such as exterior materials of electrical and electronic products, automobile components, building materials, and optical components. In order to further improve the physical properties of the polycarbonate, a polysiloxane structure can be introduced into the main chain of the polycarbonate, thereby improving various physical properties.

However, the polycarbonate in which the polysiloxane structure is introduced has reduced fluidity, which becomes a factor for lowering the processability.

Therefore, as the polycarbonate resin composition of the present invention includes a second copolycarbonate into which a sebacoyl structure is introduced, together with a first copolycarbonate into which a polysiloxane structure is introduced in the main chain of the polycarbonate, it is possible to maintain maximum physical properties of the copolycarbonate in which the polysiloxane structure is introduced and at the same time improve melting properties.

Hereinafter, the polycarbonate resin composition according to a specific embodiment of the present invention will be described in more detail.

First Copolycarbonate

The first copolycarbonate according to the present invention means a polymer in which a polysiloxane structure is introduced into the main chain of the polycarbonate.

The main chain of the polycarbonate is formed by reaction of an aromatic diol compound and a carbonate precursor, and specifically, it means a repeating unit represented by Chemical Formula 1 above.

In Chemical Formula 1, preferably, $R_1$ to $R_4$ are each independently hydrogen, methyl, chloro, or bromo.

In addition, preferably, $Z_1$ is a linear or branched $C_{1-10}$ alkylene unsubstituted or substituted with a phenyl, and more preferably, methylene, ethane-1,1-diyl, propane-2,2-diyl, butane-2,2-diyl, 1-phenylethane-1,1-diyl, or diphenylmethylene. Further, preferably, $Z_1$ is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

As used herein, 'derived from aromatic diol compounds' means that a hydroxy group of the aromatic diol compound and the carbonate precursor are reacted to form the repeating unit represented by Chemical Formula 1.

For example, when bisphenol A, i.e., the aromatic diol compound, and triphosgene, i.e., the carbonate precursor, are polymerized, the repeating unit represented by Chemical Formula 1 may be represented by Chemical Formula 1-1 below:

[Chemical Formula 1-1]

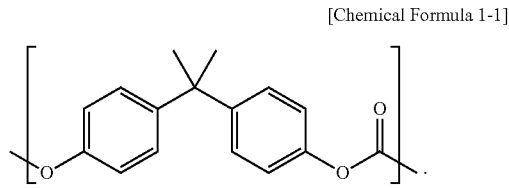

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromo phosgene, and bishaloformate may be used. Preferably, triphosgene or phosgene may be used.

Further, the polysiloxane structure means a repeating unit represented by Chemical Formula 2 and a repeating unit represented by Chemical Formula 3.

In Chemical Formula 2, preferably, each $X_1$ is independently a $C_{2-10}$ alkylene, more preferably a $C_{2-4}$ alkylene, and most preferably propane-1,3-diyl.

Further, preferably, each $R_5$ is independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. Further, preferably, each $R_5$ is independently a $C_{1-10}$ alkyl, more preferably a $C_{1-6}$ alkyl, still more preferably a $C_{1-3}$ alkyl, and most preferably methyl.

Further, preferably, the n is an integer of 10 or more, 15 or more, 20 or more, 25 or more, 30 or more, 31 or more, or 32 or more, and 50 or less, 45 or less, 40 or less, 39 or less, 38 or less, or 37 or less.

In Chemical Formula 3, preferably, each $X_2$ is independently a $C_{2-10}$ alkylene, more preferably a $C_{2-6}$ alkylene, and most preferably isobutylene.

Further, preferably, $Y_1$ is hydrogen.

Further, preferably, each $R_6$ is independently hydrogen, methyl, ethyl, propyl, 3-phenylpropyl, 2-phenylpropyl, 3-(oxiranylmethoxy)propyl, fluoro, chloro, bromo, iodo, methoxy, propoxy, allyl, 2,2,2-trifluoroethyl, 3,3,3-trifluoropropyl, phenyl, or naphthyl. Further, preferably, each $R_6$ is independently a $C_{1-10}$ alkyl, more preferably a $C_{1-6}$ alkyl, still more preferably a $C_{1-3}$ alkyl, and most preferably methyl.

Preferably, the m is an integer of 30 or more, 40 or more, 45 or more, 50 or more, 53 or more, 55 or more, or 56 or more, and 70 or less, 65 or less, 63 or less, 62 or less, 61 or less, or 60 or less.

The repeating unit represented by Chemical Formula 2 and the repeating unit represented by Chemical Formula 3 are derived from a siloxane compound represented by Chemical Formula 2-1 below and a siloxane compound represented by Chemical Formula 3-1 below, respectively.

[Chemical Formula 2-1]

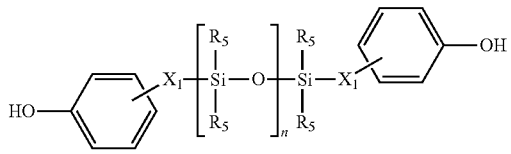

Herein, in Chemical Formula 2-1,
$X_1$, $R_5$, and n are the same as previously defined.

[Chemical Formula 3-1]

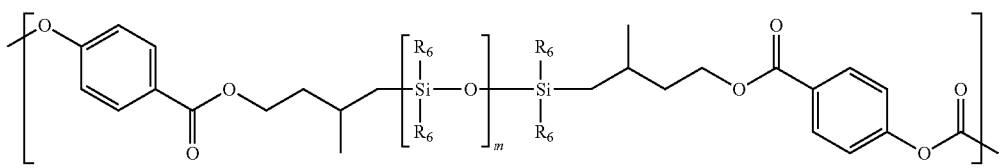

Herein, in Chemical Formula 3-1,
$X_2$, $Y_1$, $R_6$, and m are the same as previously defined.

As used herein, 'derived from a siloxane compound' means that a hydroxy group of each of the siloxane compounds and a carbonate precursor are reacted to form the repeating unit represented by Chemical Formula 2 and the repeating unit represented by Chemical Formula 3, respectively. Further, descriptions of the carbonate precursors that may be used for the formation of the repeating units represented by Chemical Formulas 2 and 3 are the same as those described for the carbonate precursor that may be used for the formation of the repeating unit represented by Chemical Formula 1 described above.

Moreover, the first copolycarbonate can control the amounts of the respective repeating units, thereby simultaneously improving several physical properties of the copolycarbonate. The weight ratio between the repeating units may be 1:99 to 99:1. It is preferably 3:97 to 97:3, and more preferably 5:95 to 95:5. The weight ratio of the repeating units corresponds to the weight ratio of the siloxane compounds, for example, the siloxane compound represented by Chemical Formula 2-1 and the siloxane compound represented by Chemical Formula 3-1.

Preferably, the repeating unit represented by Chemical Formula 2 is represented by Chemical Formula 2-2 below.

[Chemical Formula 2-2]

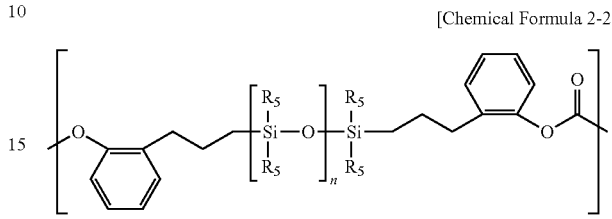

Herein, in Chemical Formula 2-2, $R_5$ and n are the same as previously defined. Preferably, $R_5$ is methyl.

Further, preferably, the repeating unit represented by Chemical Formula 3 is represented by Chemical Formula 3-2 below.

[Chemical Formula 3-2]

Herein, in Chemical Formula 3-2, $R_6$ and m are the same as previously defined. Preferably, $R_6$ is methyl.

Further, the weight ratio of the repeating unit represented by Chemical Formula 1 to the total weight of the repeating unit represented by Chemical Formula 2 and the repeating unit represented by Chemical Formula 3 (Chemical Formula 1: (Chemical Formula 2 and Chemical Formula 3)) is 1:0.001 to 1:0.2, and more preferably 1:0.01 to 1:0.1. The weight ratio of the repeating units corresponds to a weight ratio of the aromatic diol compound and the siloxane compound used to form the repeating units of Chemical Formulas 2 and 3.

The first copolycarbonate has a weight average molecular weight (g/mol) of 1000 to 100,000, preferably 30,000 to 70,000, and more preferably 50,000 to 60,000.

Second Copolycarbonate

The second copolycarbonate is a polymer in which a sebacoyl structure is introduced, and includes a repeating unit represented by Chemical Formula 1 and a repeating unit represented by Chemical Formula 4.

In Chemical Formula 4, preferably, $Z_2$ is a linear or branched $C_{1-10}$ alkylene unsubstituted or substituted with a phenyl, and more preferably, methylene, ethane-1,1-diyl, propane-2,2-diyl, butane-2,2-diyl, 1-phenylethane-1,1-diyl, or diphenylmethylene. Further, preferably, $Z_2$ is cyclohexane-1,1-diyl, O, S, SO, $SO_2$, or CO.

Preferably, the repeating unit represented by Chemical Formula 4 is represented by Chemical Formula 4-1 below.

[Chemical Formula 4-1]

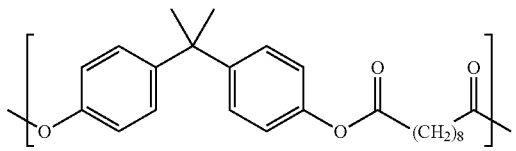

The second copolycarbonate can be prepared by polymerizing a composition containing a compound represented by Chemical Formula 4-2 below, an aromatic diol compound, and a carbonic acid precursor.

[Chemical Formula 4-2]

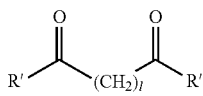

Herein, in Chemical Formula 4-2,

R' is hydrogen, OH, a $C_{1-10}$ alkyl, or a halogen, and l is the same as previously defined.

In this case, the compound represented by Chemical Formula 4-2 can be contained in an amount of 0.001 parts by weight or more, 0.01 parts by weight or more, or 0.1 parts by weight or more, and 10 parts by weight or less, 5 parts by weight or less, or 4 parts by weight or less, based on 100 parts by weight of the aromatic diol compound. In such a polymerization step, the content of Chemical Formula 4-2 can be adjusted, thereby adjusting the weight ratio of the repeating unit represented by Chemical Formula 1 and the repeating unit represented by Chemical Formula 4.

Further, descriptions of the aromatic diol compound and the carbonate precursor are the same as those described for the aromatic diol compound and the carbonate precursor which can be used for forming the repeating unit of Chemical Formula 1 described above.

The polymerization is preferably carried out by interfacial polymerization. During the interfacial polymerization, the polymerization reaction can be carried out at a low temperature under normal pressure, and thus may easily control the molecular weight.

The polymerization temperature may be preferably 0 to 40° C., and the reaction time may be preferably 10 min to 5 h. Further, during the reaction, pH may be preferably maintained at 9 or more, or 11 or more.

The solvent that can be used in the polymerization is not particularly limited as long as it is a solvent that is usually used in the polymerization of polycarbonates. As one example, halogenated hydrocarbons such as methylene chloride, chlorobenzene, etc., may be used.

Further, the polymerization may be preferably carried out in the presence of an acid binder. The acid binder may include, for example, alkali metal hydroxides such as sodium hydroxide, potassium hydroxide, etc., or amine compounds such as pyridine, etc.

In order to control the molecular weight of the copolycarbonate during the polymerization, it is desirable to carry out polymerization in the presence of a molecular weight modifier. As the molecular weight modifier, a $C_{1-20}$ alkyl phenol may be used. Specific examples thereof include p-tert-butyl phenol, p-cumyl phenol, decyl phenol, dodecyl phenol, tetradecyl phenol, hexadecyl phenol, octadecyl phenol, eicosyl phenol, docosyl phenol, or triacontyl phenol.

The molecular weight modifier may be added before the initiation of polymerization, during the initiation of polymerization, or after the initiation of polymerization. The molecular weight modifier may have, for example, an amount of 0.01 parts by weight or more, 0.1 parts by weight or more, or 1 part by weight or more, and 10 parts by weight or less, 6 parts by weight or less, or 5 parts by weight or less, based on 100 parts by weight of the aromatic diol compound. Within the range as described above, a desired molecular weight may be obtained.

Further, a reaction accelerator, for example, a tertiary amine compound such as triethylamine, tetra-n-butylammonium bromide, tetra-n-butylphosphonium bromide, or the like, a quaternary ammonium compound, a quaternary phosphonium compound, or the like, may be further used for accelerating the polymerization reaction.

The second copolycarbonate has a weight average molecular weight (g/mol) of 1000 to 100,000, preferably 30,000 to 70,000, and more preferably 50,000 to 60,000.

Polycarbonate Resin Composition

The polycarbonate resin composition according to the present invention includes the first copolycarbonate and the second copolycarbonate described above.

The mixing ratio of the first copolycarbonate and the second copolycarbonate may be controlled, thereby adjusting the melting properties of the polycarbonate resin composition. Preferably, in the polycarbonate resin composition, the weight ratio of the first copolycarbonate and the second polycarbonate may be 1:0.1 to 1:10, 1:0.25 to 1:5, 1:0.5 to 1:3, 1:5 to 1:2.5, 1:0.5 to 1:2, or 1:1 to 1:2.

That is, it is possible to simultaneously improve the mechanical properties and melt properties (fluidity) of the polycarbonate resin composition within the preferable range of the above weight ratio. However, when the weight ratio is out of the above range, it is difficult to simultaneously improve the mechanical properties and fluidity of the composition. For example, when the second copolycarbonate is included in the composition in an excessively high weight ratio, the impact strength of the composition at a low temperature (for example, −30° C.) can be abruptly lowered.

Further, the polycarbonate resin composition has a weight average molecular weight (g/mol) of 1000 to 100,000, preferably 30,000 to 70,000, and more preferably 40,000 to 60,000.

Further, preferably, the polycarbonate resin composition according to the present invention has a room temperature impact strength of 800 to 1100 J/m, as measured at 23° C. in accordance with ASTM D256 (⅛ inch, Notched Izod). More preferably, the room temperature impact strength (J/m) is 800 or more, or 840 or more. The higher the value of the room temperature impact strength (J/m), the better it is. Thus, the upper limit thereof is not limited, but it may be, for example, 1050 or less, or 1000 or less.

Further, preferably, the copolycarbonate according to the present invention has a low-temperature impact strength of 600 to 1000 J/m, as measured at −30° C. in accordance with ASTM D256 (⅛ inch, Notched Izod). More preferably, the low-temperature impact strength (J/m) is 630 or more, or 650 or more. The higher the value of the low-temperature impact strength (J/m), the better it is. Thus, the upper limit thereof is not limited, but it may be, for example, 950 or less, or 900 or less.

Further, preferably, the copolycarbonate according to the present invention has fluidity of 7 to 30 g/10 min, as measured in accordance with ASTM D1238 (under conditions of 300° C. and 1.2 kg). More preferably, the fluidity (g/10 min) is 7.2 or more, 7.3 or more, or 7.4 or more, and 18 or less, 15 or less, or 13 or less.

Further, preferably, the copolycarbonate according to the present invention has chemical resistance of 18 to 50 min as measured in accordance with a Mini Jig measurement method. More preferably, the chemical resistance (min) is 19 or more, or 20 or more, and 40 or less, 30 or less, or 28 or less.

The polycarbonate resin composition may further include a polycarbonate, and the polycarbonate is characterized in that a polysiloxane structure is not introduced into the main chain of the polycarbonate.

Preferably, the polycarbonate includes a repeating unit represented by Chemical Formula 5:

[Chemical Formula 5]

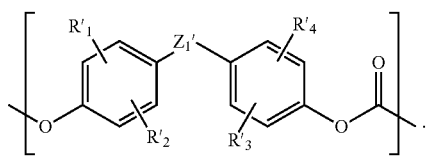

wherein, in Chemical Formula 5, $R'_1$ to $R'_4$ are each independently hydrogen, a $C_{1-10}$ alkyl, a $C_{1-10}$ alkoxy, or a halogen, and $Z_1'$ is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO.

Further, preferably, the polycarbonate has a weight average molecular weight of 1000 to 100,000 g/mol, and more preferably 20,000 to 60,000 g/mol.

The repeating unit represented by Chemical Formula 5 is formed by reacting an aromatic diol compound and a carbonate precursor. The aromatic diol compound and the carbonate precursor that can be used here are the same as those described for the repeating unit represented by Chemical Formula 1 described above.

Preferably, $R'_1$ to $R'_4$ and $Z'_1$ in Chemical Formula 5 are the same as $R_1$ to $R_4$ and $Z_1$ in Chemical Formula 1, respectively.

Further, preferably, the repeating unit represented by Chemical Formula 5 is represented by Chemical Formula 5-1 below.

[Chemical Formula 5-1]

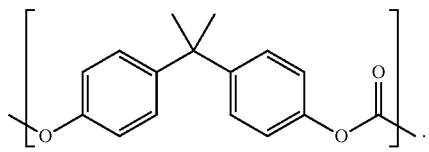

The polycarbonate resin composition may further include at least one selected from the group consisting of an antioxidant, a heat stabilizer, a photo-stabilizer, a plasticizer, an antistatic agent, a nucleating agent, a flame retardant, a lubricant, an impact reinforcing agent, a fluorescent whitening agent, an ultraviolet absorber, a pigment, and a dye, if necessary.

In addition, the present invention provides an article including the polycarbonate resin composition. Preferably, the article is an injection molded article.

The method of producing the article may be carried out by mixing the polycarbonate resin composition according to the present invention, and optionally, the above-mentioned additives, using a mixer, extrusion-molding the mixture into an extruder to prepare pellets, drying the pellets, and injecting the dried pellets into an injection molding machine.

Advantageous Effects

As described above, as the polycarbonate resin composition according to the present invention includes a copolycarbonate into which a sebacoyl structure is introduced, together with a copolycarbonate into which a polysiloxane structure is introduced in the main chain of the polycarbonate, it is possible to maintain excellent physical properties of the copolycarbonate at the maximum and at the same time improve melting properties thereof.

DETAILED DESCRIPTION OF THE EMBODIMENTS

The present invention will be described by way of examples. However, the following examples are for illustrative purposes only and are not intended to limit the scope of the present invention thereto.

Preparation Example 1: AP-PDMS (n=34)

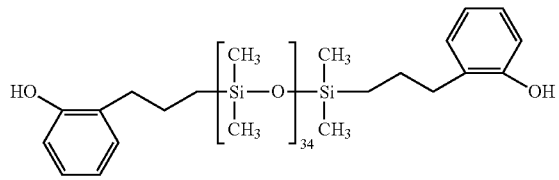

After 47.6 g (160 mmol) of octamethylcyclotetrasiloxane and 2.40 g (17.8 mmol) of tetramethyldisiloxane were mixed with each other, the mixture was placed in a 3 L flask with 1 part by weight of acid clay (DC-A3) based on 100 parts by weight of octamethylcyclotetrasiloxane, and reacted at 60° C. for 4 h. After the reaction was terminated, the mixture was diluted with ethylacetate and quickly filtered using Celite. The number of repeating units (n) of the unmodified polyorganosiloxane obtained as described above was 34 when confirmed through $^1$H NMR.

4.81 g (35.9 mmol) of 2-allylphenol and 0.01 g (50 ppm) of Karstedt's platinum catalyst were added to the obtained terminal-unmodified polyorganosiloxane and reacted at 90° C. for 3 h. After the reaction was terminated, the unreacted siloxane was removed by evaporation under conditions of 120° C. and 1 torr. The terminal-modified polyorganosiloxane obtained as described above was designated as AP-PDMS (n=34). The AP-PDMS was a pale yellow oil, the repeating unit (n) was 34 when confirmed through $^1$H NMR using Varian 500 MHz, and further purification was not required.

Preparation Example 2: MBHB-PDMS (m=58)

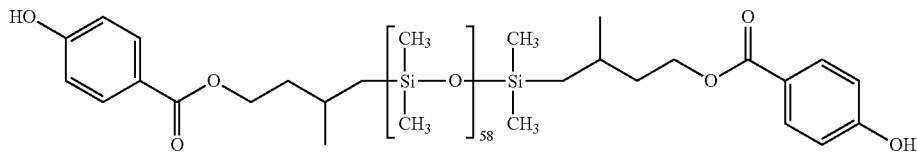

After 47.60 g (160 mmol) of octamethylcyclotetrasiloxane and 1.5 g (11 mmol) of tetramethyldisiloxane were mixed with each other, the mixture was placed in a 3 L flask with 1 part by weight of acid clay (DC-A3) based on 100 parts by weight of octamethylcyclotetrasiloxane, and reacted at 60° C. for 4 h. After the reaction was terminated, the reaction product was diluted with ethylacetate and quickly filtered using Celite. The repeating unit (m) of the terminal unmodified polyorganosiloxane obtained as described above was 58 when confirmed through $^1$H NMR.

6.13 g (29.7 mmol) of 3-methylbut-3-enyl 4-hydroxybenzoate and 0.01 g (50 ppm) of Karstedt's platinum catalyst were added to the obtained terminal-unmodified polyorganosiloxane and reacted at 90° C. for 3 h. After the reaction was terminated, the unreacted siloxane was removed by evaporation under conditions of 120° C. and 1 torr. The terminal-modified polyorganosiloxane obtained as described above was designated as MBHB-PDMS (m=58). The MBHB-PDMS was a pale yellow oil, the repeating unit (m) was 58 when confirmed through $^1$H NMR using Varian 500 MHz, and further purification was not required.

Example 1: 7% PDMS (95:5):0.5% SBC PC=1:1 i) Preparation of PC-A 620 g of $H_2O$, 116.47 g of bisphenol A (BPA), 11.66 g of AP-PDMS prepared in Preparation Example 1, 0.61 g of MBHB-PDMS prepared in Preparation Example 2, 102.5 g of NaOH, and 200 ml of $MeCl_2$ were added to a 2 L main reactor equipped with a nitrogen purge device and a condenser and enabling maintenance at room temperature using a circulator, followed by stirring for several minutes.

Nitrogen purging was stopped, 62 g of triphosgene and 120 g of $MeCl_2$ were placed in a 1 L round bottom flask, triphosgene was dissolved therein, and the dissolved triphosgene solution was slowly added to the main reactor containing the BPA solution. After the addition was completed, 2.12 g of PTBP was added and stirred for 10 min. After stirring was completed, 97 g of a 40 wt % NaOH aqueous solution was added, and 1.16 g of TEA as a coupling agent was added. At this time, reaction pH was maintained at 11 to 13.

After the reaction solution was allowed to stand for a prescribed time for sufficient reaction, pH was decreased to 3-4 by addition of HCl to complete the reaction. Then, stirring was stopped, the polymer layer was separated from the aqueous layer, the aqueous layer was removed, and the residue was washed with pure $H_2O$ again, and the above process was repeated a total of 3 to 5 times.

After the washing was completely carried out, only the polymer layer was extracted, and the copolycarbonate crystals (PC-A) were obtained by re-precipitation using a non-solvent of methanol, $H_2O$, or the like.

The weight average molecular weight (Mw) of the copolycarbonate (PC-A) measured using GPC (40° C., THF, polystyrene standard) was 55,000 g/mol.

ii) Preparation of PC-B 620 g of $H_2O$, 116.47 g of BPA, 0.93 g of sebacoyl chloride, 102.5 g of NaOH, and 200 ml of $MeCl_2$ were added to a 2 L main reactor equipped with a nitrogen purge device and a condenser and enabling maintenance at room temperature using a circulator, followed by stirring for several minutes.

Nitrogen purging was stopped, 62 g of triphosgene and 120 g of $MeCl_2$ were placed in a 1 L round bottom flask, triphosgene was dissolved therein, and the dissolved triphosgene solution was slowly added to the main reactor containing the BPA solution. After the addition was completed, 2.12 g of PTBP was added and stirred for 10 min. After stirring was completed, 97 g of a 40 wt % NaOH aqueous solution was added, and 1.16 g of TEA as a coupling agent was added. At this time, reaction pH was maintained at 11 to 13.

After the reaction solution was allowed to stand for a prescribed time for sufficient reaction, pH was decreased to 3-4 by addition of HCl to complete the reaction. Then, stirring was stopped, the polymer layer was separated from the aqueous layer, the aqueous layer was removed, and the residue was washed with pure $H_2O$ again, and the above process was repeated a total of 3 to 5 times.

After the washing was completely carried out, only the polymer layer was extracted, and the copolycarbonate crystals (PC-B) were obtained by re-precipitation using a non-solvent of methanol, $H_2O$, or the like.

The weight average molecular weight (Mw) of the copolycarbonate (PC-B) measured using GPC (40° C., THF, polystyrene standard) was 55,000 g/mol.

iii) Mixing of PC-A and PC-B

The PC-A and PC-B prepared as described above were mixed in a weight ratio of 1:1 and extruded.

Example 2: 7% PDMS (95:5):1% SBC PC=1:1

The PC-A and PC-B were respectively prepared in the same manner as in Example 1, except that the use amount of sebacoyl chloride was changed to 1.87 g in the preparation of PC-B.

Here, the weight average molecular weight of the PC-B measured using GPC (40° C., THF, polystyrene standard) was 55,200 g/mol.

The PC-A and PC-B prepared as described above were mixed in the weight ratio of 1:1 and extruded.

Example 3: 7% PDMS (95:5):3% SBC PC=1:1

The PC-A and PC-B were respectively prepared in the same manner as in Example 1, except that the use amount of sebacoyl chloride was changed to 5.6 g in the preparation of PC-B.

Here, the weight average molecular weight of the PC-B measured using GPC (40° C., THF, polystyrene standard) was 55,000 g/mol.

The PC-A and PC-B prepared as described above were mixed in the weight ratio of 1:1 and extruded.

Example 4: 7% PDMS (90:10): 1% SBC PC=1:1

The PC-A was prepared in the same manner as in Example 1, except that the use amount of AP-PDMS was changed to 11.05 g and the use amount of MBHB-PDMS was changed to 1.23 g in the preparation of PC-A.

Then, the PC-B was prepared in the same manner as in Example 1, except that the use amount of sebacoyl chloride was changed to 1.87 g in the preparation of PC-B.

Here, the weight average molecular weight of the PC-A measured using GPC (40° C., THF, polystyrene standard) was 55,300 g/mol and the weight average molecular weight of the PC-B was 54,500 g/mol.

The PC-A and PC-B prepared as described above were mixed in the weight ratio of 1:1 and extruded.

Example 5: 7% PDMS (90:10):3% SBC PC=1:2

The PC-A was prepared in the same manner as in Example 1, except that the use amount of AP-PDMS was changed to 11.05 g and the use amount of MBHB-PDMS was changed to 1.23 g in the preparation of PC-A.

Then, the PC-B was prepared in the same manner as in Example 1, except that the use amount of sebacoyl chloride was changed to 1.87 g in the preparation of PC-B.

Here, the weight average molecular weight of the PC-A measured using GPC (40° C., THF, polystyrene standard) was 55,300 g/mol and the weight average molecular weight of the PC-B was 54,500 g/mol.

The PC-A and PC-B prepared as described above were mixed in the weight ratio of 1:2 and extruded.

Example 6: 7% PDMS (90:10):3% SBC PC=1:0.5

The PC-A was prepared in the same manner as in Example 1, except that the use amount of AP-PDMS was changed to 11.05 g and the use amount of MBHB-PDMS was changed to 1.23 g in the preparation of PC-A.

Then, the PC-B was prepared in the same manner as in Example 1, except that the use amount of sebacoyl chloride was changed to 1.87 g in the preparation of PC-B.

Here, the weight average molecular weight of the PC-A measured using GPC (40° C., THF, polystyrene standard) was 55,300 g/mol and the weight average molecular weight of the PC-B was 54,500 g/mol.

The PC-A and PC-B prepared as described above were mixed in the weight ratio of 1:0.5 and extruded.

Comparative Example 1: 7% PDMS (95:5): NPC=1:1

The PC-A and PC-B were respectively prepared in the same manner as in Example 1, except that sebacoyl chloride was not used in the preparation of PC-B.

Here, the weight average molecular weight of the PC-B (neat PC) measured using GPC (40° C., THF, polystyrene standard) was 54,900 g/mol.

The PC-A and PC-B prepared as described above were mixed in the weight ratio of 1:1 and extruded.

Comparative Example 2: 3.5% PDMS (95:5)

The PC-A was prepared in the same manner as in Example 1, except that the use amount of AP-PDMS was changed to 5.5 g and the use amount of MBHB-PDMS was changed to 0.29 g in the preparation of PC-A. However, the PC-B was not prepared.

Here, the weight average molecular weight of the PC-A measured using GPC (40° C., THF, polystyrene standard) was 55,200 g/mol.

The PC-A prepared as described above was extruded alone.

Comparative Example 3: 0.5% SBC PC

The PC-B according to Example 1 was extruded alone.

Reference Example 1: 7% PDMS (90:1):3% SBC PC=1:3

The PC-A was prepared in the same manner as in Example 1, except that the use amount of AP-PDMS was changed to 11.05 g and the use amount of MBHB-PDMS to was changed 1.23 g in the preparation of PC-A.

Then, the PC-B was prepared in the same manner as in Example 1, except that the use amount of sebacoyl chloride was changed to 1.87 g in the preparation of PC-B.

Here, the weight average molecular weight of the PC-A measured using GPC (40° C., THF, polystyrene standard) was 55,300 g/mol and the weight average molecular weight of the PC-B was 54,500 g/mol.

The PC-A and PC-B prepared as described above were mixed in the weight ratio of 1:3 and extruded.

Reference Example 2: 7% PDMS (90:1):3% SBC PC=1:5

The PC-A was prepared in the same manner as in Example 1, except that the use amount of AP-PDMS was changed to 11.05 g and the use amount of MBHB-PDMS was changed to 1.23 g in the preparation of PC-A.

Then, the PC-B was prepared in the same manner as in Example 1, except that the use amount of sebacoyl chloride was changed to 1.87 g in the preparation of PC-B.

Here, the weight average molecular weight of the PC-A measured using GPC (40° C., THF, polystyrene standard) was 55,300 g/mol and the weight average molecular weight of the PC-B was 54,500 g/mol.

The PC-A and PC-B prepared as described above were mixed in the weight ratio of 1:5 and extruded.

Experimental Example

Physical properties of each sample were measured by the following methods, and results thereof are shown in Table 1 and 2 below.

1) Weight Average Molecular Weight: measured by GPC using a PC standard using Agilent 1200 series 2) Room Temperature and Low-Temperature Impact Strength: measured at room temperature and at −30° C. (low temperature) in accordance with ASTM D256 (⅛ inch, Notched Izod)

3) Fluidity (Melt Index: MI): measured in accordance with ASTM D1238 (under conditions of 300° C. and 1.2 kg).

4) Chemical Resistance (Jig Test): sample with a size of 13 mm*64 mm*⅛ inch was attached closely to a mini jig (58.5 R). After raising 5 mm*13 mm cotton in the center, 0.5 ml of Nivea Sun Spray was placed thereon. The time required to generate a gap was measured for the closely attached sample.

TABLE 1

|  | Example 1 | Example 2 | Example 3 | Example 4 | Example 5 | Example 6 |
|---|---|---|---|---|---|---|
| Mw (g/mol) | 55,400 | 55,200 | 55,000 | 54,900 | 55,000 | 55,000 |
| Room temperature impact strength (J/mol) | 850 | 850 | 840 | 850 | 840 | 860 |
| Low-temperature impact strength (J/mol) | 710 | 670 | 680 | 710 | 640 | 770 |
| MI (g/10 min) | 7.4 | 9.2 | 10.4 | 9.1 | 11.2 | 9.0 |
| Chemical resistance (min) | 20 | 24 | 22 | 25 | 20 | 29 |

TABLE 2

|  | Comparative Example 1 | Comparative Example 2 | Comparative Example 3 | Reference Example 1 | Reference Example 2 |
|---|---|---|---|---|---|
| Mw (g/mol) | 54,800 | 55,200 | 55,000 | 55,000 | 55,000 |
| Room temperature impact strength (J/mol) | 840 | 850 | 770 | 810 | 800 |
| Low temperature impact strength (J/mol) | 680 | 620 | 240 | 420 | 270 |
| MI (g/10 min) | 6.3 | 6.8 | 12 | 11.5 | 11.7 |
| Chemical resistance (min) | 20 | 18 | 10 | 20 | 18 |

Referring to Tables 1 and 2 above, it was confirmed that the polycarbonate resin compositions obtained in Examples 1 to 6 contained a copolycarbonate in which a polysiloxane structure was introduced into the main chain of the polycarbonate and a copolycarbonate in which a sebacoyl structure was introduced together, and it exhibited remarkably superior fluidity and flowability while exhibiting comparable levels of room temperature and low-temperature impact strengths, as compared with Comparative Example 2 containing only a copolycarbonate in which a polysiloxane structure was introduced into the main chain of the polycarbonate, and Comparative Example 1 obtained by mixing this with a general polycarbonate.

The invention claimed is:

1. A polycarbonate resin composition comprising:
a first copolycarbonate comprising a repeating unit represented by Chemical Formula 1 below, a repeating unit represented by Chemical Formula 2 below, and a repeating unit represented by Chemical Formula 3 below; and
a second copolycarbonate comprising a repeating unit represented by Chemical Formula 1 below and a repeating unit represented by Chemical Formula 4 below:

[Chemical Formula 1]

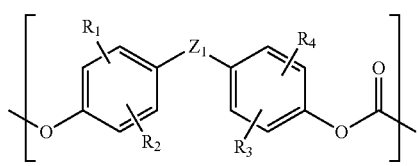

wherein, in Chemical Formula 1,
$R_1$ to $R_4$ are each independently hydrogen, a $C_{1-10}$ alkyl, a $C_{1-10}$ alkoxy, or a halogen, and
$Z_1$ is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO,

[Chemical Formula 2]

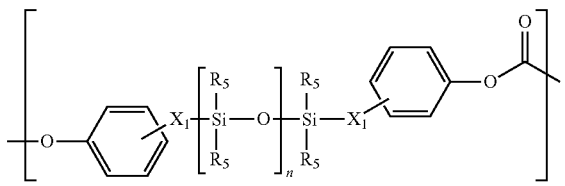

wherein, in Chemical Formula 2,
each $X_1$ is independently a $C_{1-10}$ alkylene,
each $R_5$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and
n is an integer of 10 to 200,

[Chemical Formula 3]

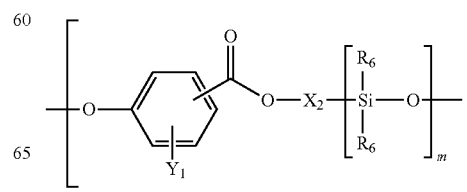

-continued

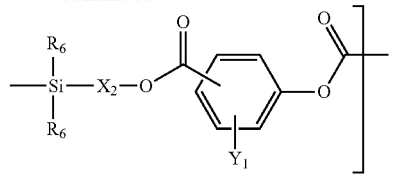

wherein, in Chemical Formula 3,
each $X_2$ is independently a $C_{1-10}$ alkylene,
each $Y_1$ is independently hydrogen, a $C_{1-6}$ alkyl, a halogen, a hydroxy, a $C_{1-6}$ alkoxy, or a $C_{6-20}$ aryl,
each $R_6$ is independently hydrogen; a $C_{1-15}$ alkyl unsubstituted or substituted with an oxiranyl, an oxiranyl-substituted $C_{1-10}$ alkoxy, or a $C_{6-20}$ aryl; a halogen; a $C_{1-10}$ alkoxy; an allyl; a $C_{1-10}$ haloalkyl; or a $C_{6-20}$ aryl, and
m is an integer of 10 to 200,

[Chemical Formula 4]

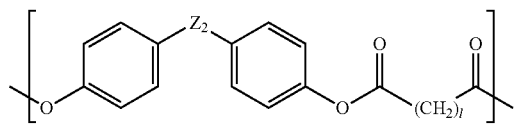

wherein, in Chemical Formula 4,
$Z_2$ is a $C_{1-10}$ alkylene unsubstituted or substituted with a phenyl, a $C_{3-15}$ cycloalkylene unsubstituted or substituted with a $C_{1-10}$ alkyl, O, S, SO, $SO_2$, or CO, and

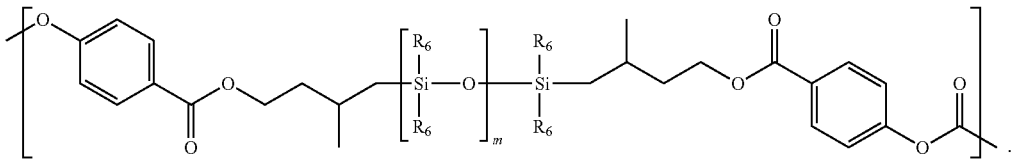

l is an integer of 1 to 10,
wherein the second copolycarbonate has a weight average molecular weight of 50,000 to 100,000 g/mol,
wherein in the first copolycarbonate, a weight ratio of the repeating unit represented by Chemical Formula 1 to total weight of the repeating unit represented by Chemical Formula 2 and the repeating unit represented by Chemical Formula 3 is 1:0.001 to 1:0.2, and
wherein the first copolycarbonate and the second polycarbonate are contained in a weight ratio 1:1 to 1:2.

2. The polycarbonate resin composition of claim 1, characterized in that the repeating unit represented by Chemical Formula 1 is represented by Chemical Formula 1-1 below:

[Chemical Formula 1-1]

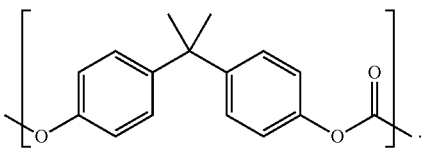

3. The polycarbonate resin composition of claim 1, characterized in that the repeating unit represented by Chemical Formula 2 is represented by Chemical Formula 2-2 below:

[Chemical Formula 2-2]

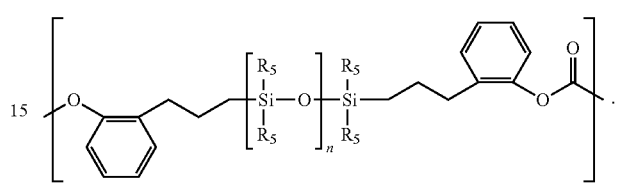

4. The polycarbonate resin composition of claim 3, characterized in that $R_5$ is methyl.

5. The polycarbonate resin composition of claim 1, characterized in that n is an integer of 10 to 50.

6. The polycarbonate resin composition of claim 1, characterized in that the repeating unit represented by Chemical Formula 3 is represented by Chemical Formula 3-2 below:

[Chemical Formula 3-2]

7. The polycarbonate resin composition of claim 6, characterized in that $R_5$ is methyl.

8. The polycarbonate resin composition of claim 1, characterized in that m is an integer of 30 to 70.

9. The polycarbonate resin composition of claim 1, characterized in that the first copolycarbonate has a weight average molecular weight of 1000 to 100,000 g/mol.

10. The polycarbonate resin composition of claim 1, characterized in that the repeating unit represented by Chemical Formula 4 is represented by Chemical Formula 4-1 below:

[Chemical Formula 4-1]

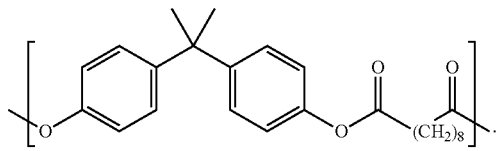

11. The polycarbonate resin composition of claim 1, further comprising a polycarbonate characterized in that a polysiloxane structure is not introduced into the main chain of the polycarbonate.

* * * * *